United States Patent [19]

Russo

[11] 4,265,473
[45] May 5, 1981

[54] MEANS AND TECHNIQUE FOR INTERCONNECTING THE ENDS OF SPACED COAXIAL CONDUITS WITH AN EXPANSION JOINT HAVING A REDUCED AXIAL DIMENSION

[76] Inventor: Baldassare Russo, 17575-6th Pl. SW., Seattle, Wash. 98166

[21] Appl. No.: 9,101

[22] Filed: Feb. 5, 1979

[51] Int. Cl.³ .............................................. F16L 51/02
[52] U.S. Cl. ................................ 285/229; 29/157 R; 285/424
[58] Field of Search ............... 285/229, 226, 227, 228, 285/236, 235, 424; 29/157 R

[56] References Cited

U.S. PATENT DOCUMENTS

| 875,844 | 1/1908 | Peacock | 285/229 X |
|---|---|---|---|
| 2,157,564 | 5/1939 | Peuthert | 285/226 X |
| 2,871,885 | 2/1959 | Ray | 285/227 |
| 3,934,905 | 1/1976 | Lockard | 285/229 |
| 4,140,338 | 2/1979 | Kazmierski, Jr. et al. | 285/236 X |

FOREIGN PATENT DOCUMENTS

| 658066 | 1/1929 | France | 285/226 |
|---|---|---|---|
| 397539 | 8/1933 | United Kingdom | 285/227 |
| 520486 | 7/1976 | U.S.S.R. | 285/226 |

Primary Examiner—Thomas F. Callaghan
Attorney, Agent, or Firm—Christopher Duffy

[57] ABSTRACT

The joint is divided circumferentially into a series of sections which are symmetrically arrayed about the axis of the conduits and interconnected by generally axially extending pleats which make it possible for the joint to accommodate to lateral deflections of the conduits at a lesser dimension axially of the joint than that heretofore required by the diametral dimension of the joint.

39 Claims, 14 Drawing Figures

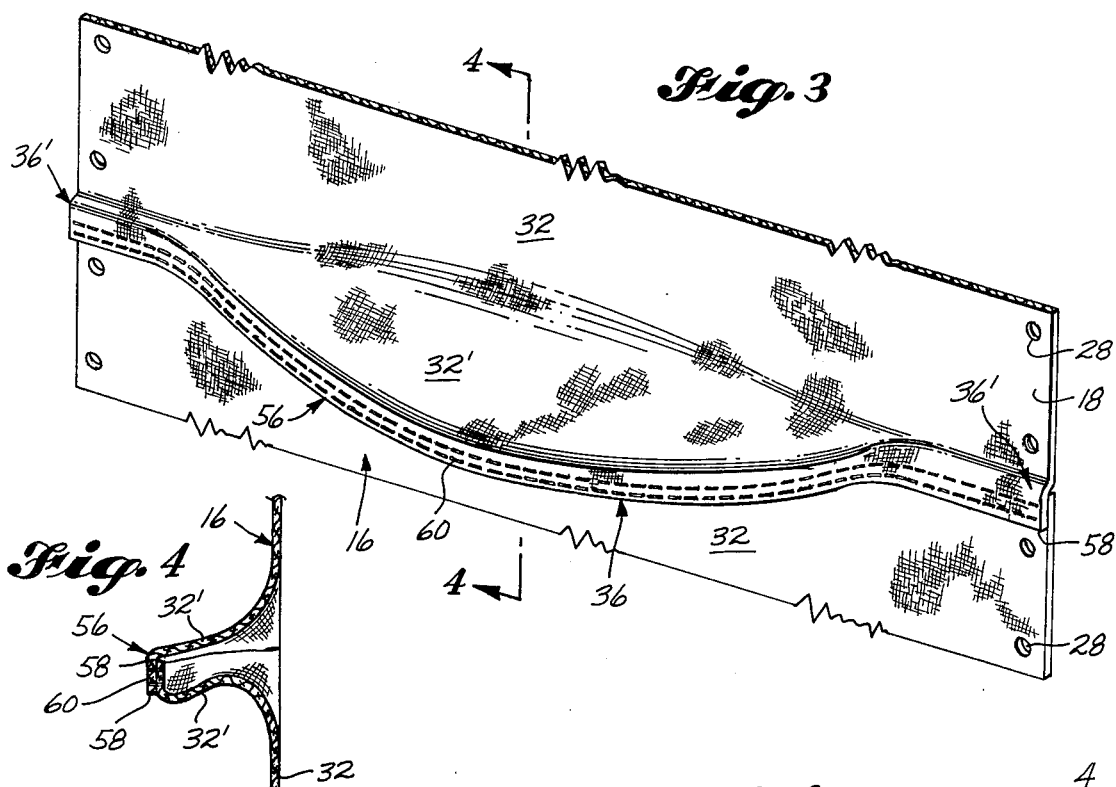
Fig. 3
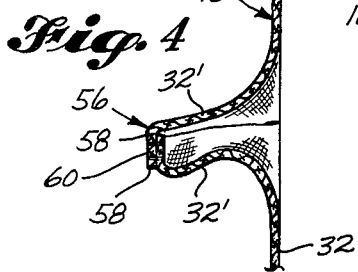
Fig. 4
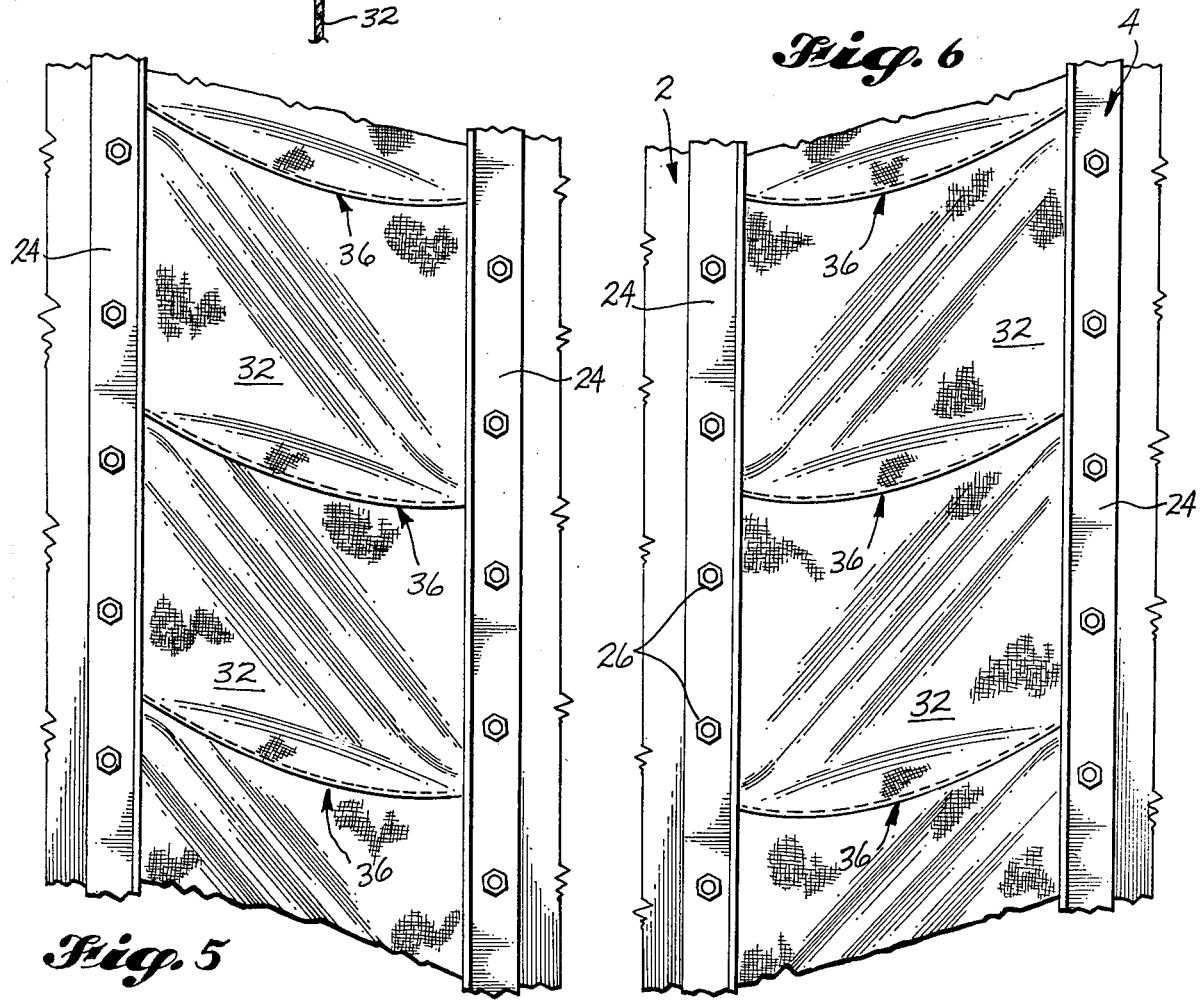
Fig. 5
Fig. 6

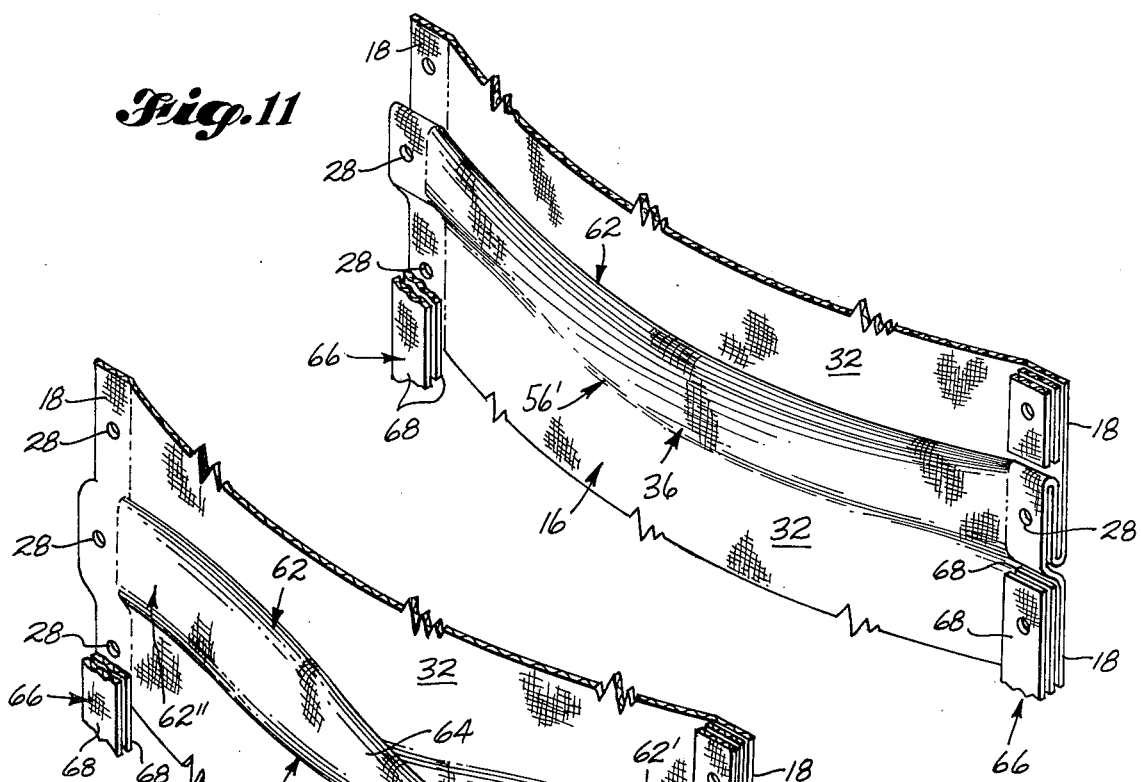
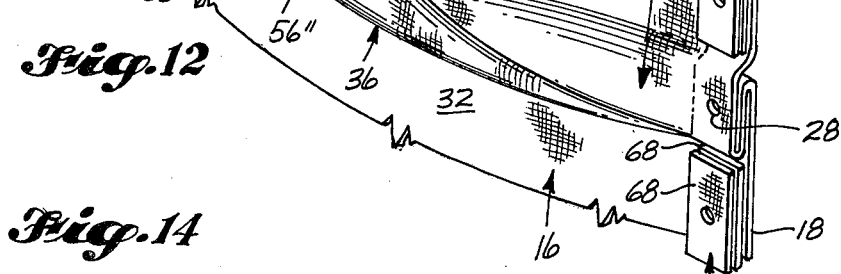
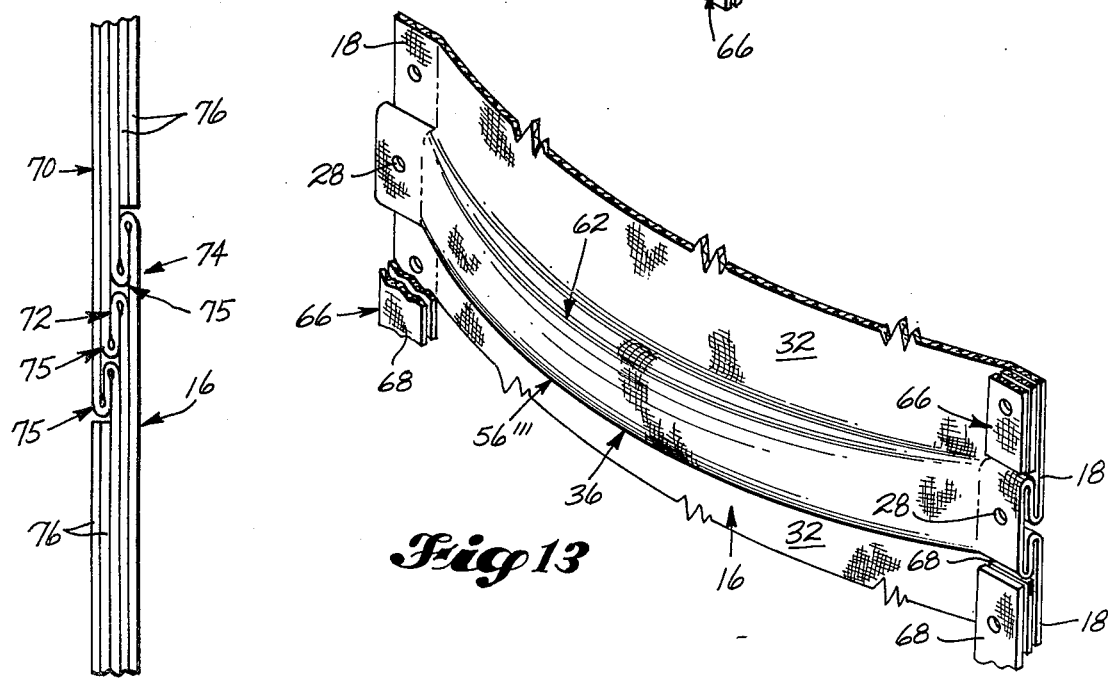

MEANS AND TECHNIQUE FOR INTERCONNECTING THE ENDS OF SPACED COAXIAL CONDUITS WITH AN EXPANSION JOINT HAVING A REDUCED AXIAL DIMENSION

THE INVENTION IN GENERAL

This invention relates to the design of expansion joints and in particular to an apparatus and technique for reducing the width needed for such joints along the axes of the pairs of conduits they interconnect.

Heretofore, when pairs of spaced, coaxial conduits were interconnected by expansion joints in the spaces between the opposing ends thereof, the axial dimension of each joint was dictated by the diametral dimension of the same since for each diametral dimension of the joint, there was a minimal axial dimension at which the ends of the conduits could offset from one another crosswise the axis without tearing the joint apart. Of course, this minimal axial dimension controlled the amount of fabric of other bendably flexible material which was employed in the joint, as well as the heat losses which the joint experienced as a result. It also controlled the diameter of the flanging or other means at the ends of the conduits by which the joint was connected with the conduits, since the greater was the axial dimension of the joint, the greater had to be the diametral dimension of the flanging to assure that when suction occurred in the joint, the joint would not collapse against the liner within the joint.

The inventive apparatus and technique free the joint from the foregoing restraints imposed on it by the relationship between the axial and diametral dimensions thereof. More particularly, they make it possible for the joint to have an axial dimension which is less than that heretofore required by the diamteral dimension of the joint. In this way, they also make it possible to reduce the amount of fabric or other bendably flexible material which is needed in the joint, and consequently, the amount of heat which is lost through the joint. They also make it possible to reduce the diameter of the flanging for the joint at the ends of the conduits, and in effect, to increase the effective length of the conduits. Other advantages and objects will become apparent from the description of the invention which follows.

According to the present invention, an annular casing of bendably flexible material is interposed in the space between the ends of the conduits to form an expansion joint between the ends in conventional fashion. However, the body of the casing is divided circumferentially into a series of sections which are symmetrically arrayed about the axis of the conduits between planes parallel thereto. The sections are interconnected across the planes by generally axially extending pleats which have generally inverted U-shaped cross sections in planes perpendicular to the axis and project peripherally inwardly or outwardly from the body of the casing in the neutral condition of the joint. Moreover, the pleats and sections are interconnected with the ends of the conduits so that when the ends undergo relative motion crosswise the axis of the conduits, the casing accommodates to the deflection at a lesser dimension axially of the joint than that required by the diametral dimension of the joint.

In the presently preferred embodiments of the invention, each pleat is formed by relatively juxtaposing the adjacent axial edge portions of the adjacent sections of the casing and interconnecting the respective edges of the portions with one another to form a fold of the casing material between the sections. For example, the sections may be discrete pieces of material and the relatively juxtaposed axial edge portions of the same may be interconnected by securing them to one another adjacent the edges thereof to form the fold. Or the sections may be monolithic and the fold may be a continuum thereof in the sense that a portion of the casing material is gathered between the sections and relatively raised out of the body of the casing to form the fold. Where the sections are discrete pieces of material and secured to one another as indicated, preferably the fold is given an arcuate bulge axially thereof between the circumferential margins of the casing, as for example, by making the relatively juxtaposed axial edge portions of the sections convexly arcuate at their edges. Where the sections are monolithic and the fold is a continuum thereof, preferably the fold is bent in one direction circumferentially of the joint so as to overlie the adjacent section between the circumferential margins of the casing. Alternatively, the fold may be flattened so as to overlie both of the adjacent sections between the margins. Or one end portion of the fold may be bent so as to overlie one of the adjacent sections, and the other end portion of the fold may be bent so as to overlie the other adjacent section, there being a twist formed in the fold between the two end portions to accommodate the reversedly bent nature of them.

The sections may be interconnected with the ends of the conduits by clamping the circumferential margins of the casing material to the ends. Also, the pleats may be terminated in the circumferential margins of the casing so that the pleats are also interconnected with the ends of the conduits in this fashion. Depending on the character and/or thickness of the casing material, and/or the number of plies of material in each pleat, strips of filler material may be interposed in the circumferential spaces between the terminal ends of the pleats to impart a uniform thickness to the margins of the casing around the circumference thereof.

The casing may comprise a single layer of casing material or two or more relatively superposed layers of the same. In the latter instance, the folds in the respective layers are grouped in relatively stacked assemblies thereof, and are bent over in a common direction circumferentially of the joint, but relatively staggered to one another in such direction. Also, filler strips are overlaid in the circumferential spaces adjacent the fold assemblies in such direction, but underlaid in the spaces adjacent the assemblies in the opposite direction.

BRIEF DESCRIPTION OF THE DRAWINGS

The foregoing steps and features will be better understood by reference to the accompanying drawings which illustrate several of the preferred embodiments of the invention.

In the drawings.

FIG. 3 is a part perspective view of the joint showing the pleat used between pairs of sections therein;

FIG. 4 is a cross-sectional view of the pleat along the line 4—4 of FIG. 3;

FIG. 5 is a part side elevational view of the joint when the ends of the conduits have undergone relative motion in directions crosswise the axis thereof;

FIG. 6 is a similar view when the ends have undergone such motion in opposite directions;

FIG. 11 is a view similar to FIG. 3 but showing a different form of pleat;

FIG. 12 is another such view showing a third form of pleat;

FIG. 13 is still another such view showing a fourth form of pleat;

FIG. 14 is a part cross-sectional view of a joint in which two or more relatively superposed layers of casing material are employed in making up the joint.

DESCRIPTION OF THE PREFERRED EMBODIMENTS

Figure 1:
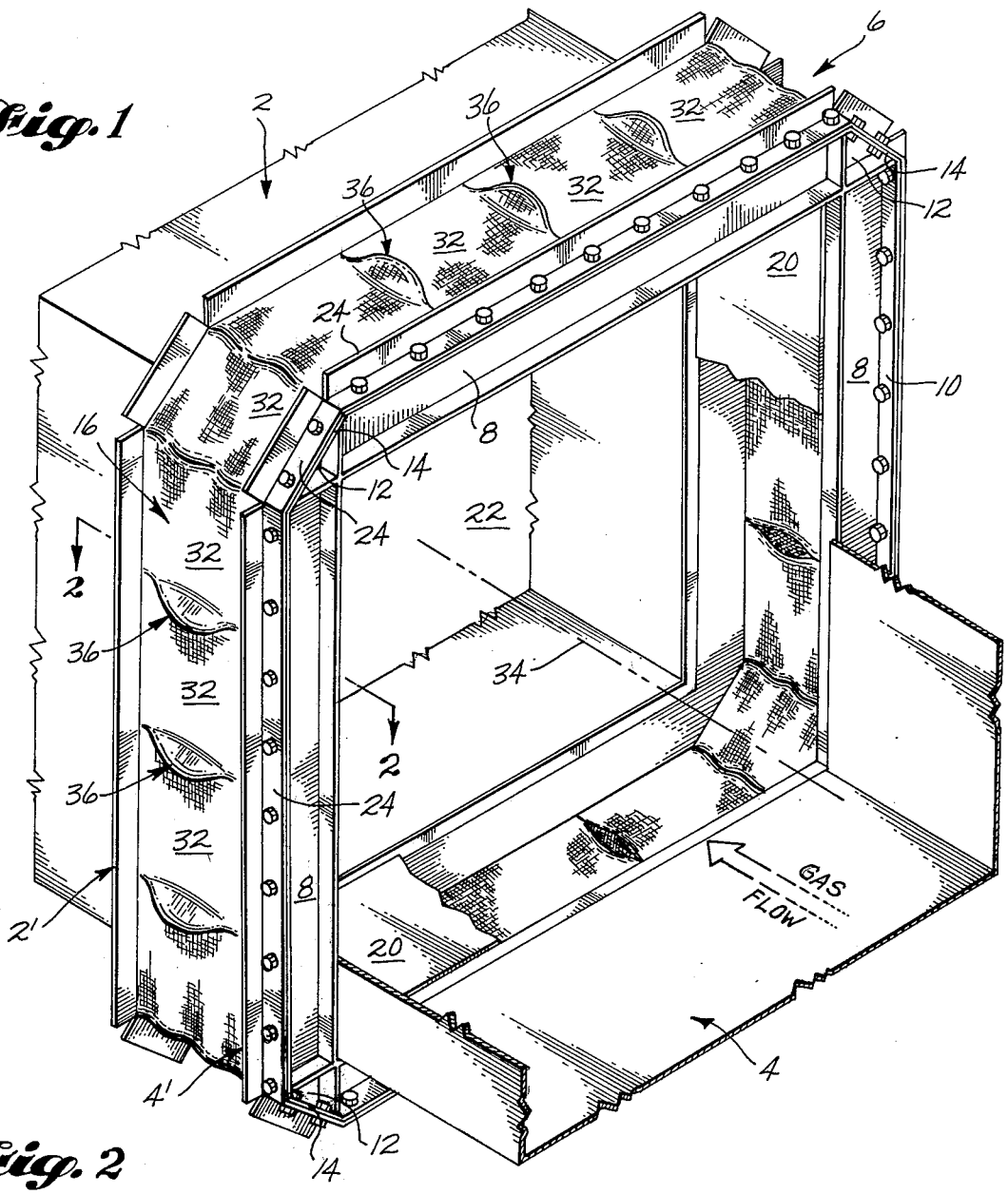
FIG. 1 is a part cut-away, part perspective view of an installation having an expansion joint fabricated in accordance with the invention.
Figure 2:
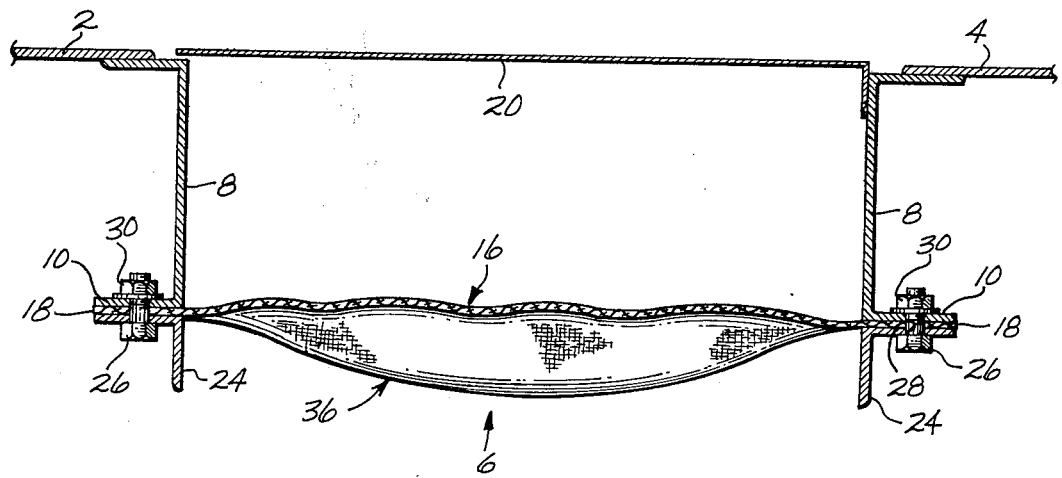
FIG. 2 is a cross-sectional view of the joint along the line 2—2 of FIG. 1.
Figure 7:
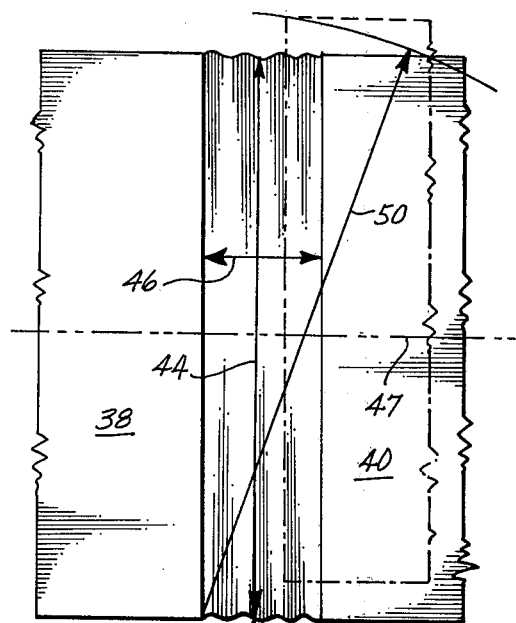
FIG. 7 is a schematic representation of a prior art installation showing a typical joint therein.
Figure 8:
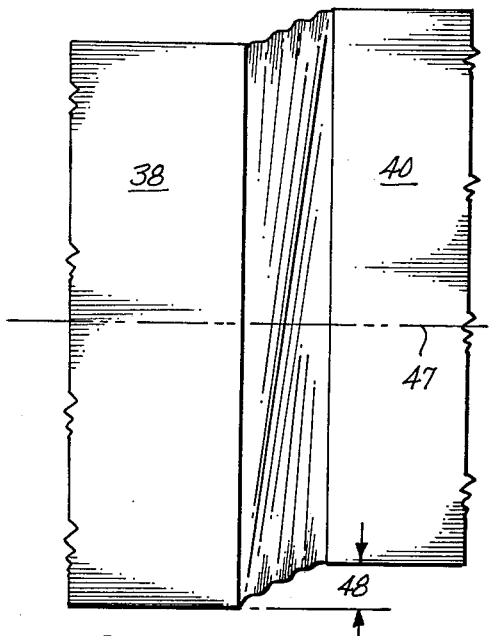
FIG. 8 is another such view of the prior art installation showing the action of the joint when the ends of the conduits undergo relative motion as described.

Referring to the drawings and firstly to FIGS. 1–6, it will be seen that the inventive installation comprises a pair of spaced, coaxial, quadrilateral conduits 2 and 4 which are interconnected by an expansion joint 6 in the space between the opposing ends 2' and 4' thereof. For this purpose, the respective sides of the ends have outturned flanges 8 thereon, and the flanges 8 in turn have right angular shoulders 10 on the rims thereof. In addition, there are fillet flanges 12 in the corners between the flanges 8, and these also have the right angular shoulders 14 on the rims thereof. The joint 6 comprises an annular casing 16 of fabric or other bendably flexible material, and the circumferential margins 18 of the casing are clamped to the shoulders 10, 14 of the various flanges 8, 12 to seal the joint in conventional fashion. See FIG. 2. Also, in conventional fashion, plates 20 are affixed to the flanges 8 at the inner periphery of one conduit, 4, and are extended slidably into engagement with the flanges 8 of the other conduit 2 at the inner periphery thereof, to line the space between the conduits inside of the joint and provide a smooth bore 22 through which gases can flow within the installation.

Referring now to the joint 6 in more specific terms, it will be seen that the margins 18 of the casing are clamped to the shoulders 10, 14 through the use of right angular clamping irons 24 which are attached to the shoulders by bolts 26 that are passed through registering holes 28 (FIGS. 2 and 3) in the shoulders, irons and margins of the casing material, and secured by nuts 30 at symmetrical points about the circumferences of the margins. According to the invention, moreover, the body of the casing 16 is divided circumferentially into a series of sections 32 which are symmetrically arrayed about the axis 34 of the conduits between planes parallel thereto. The sections 32 are interconnected across the planes by generally axially extending pleats 36 which have generally inverted U-shaped cross sections in planes perpendicular to the axis and project peripherally outwardly from the body 16 of the casing in the neutral condition of the joint. Moreover, the pleats 36 terminate in the circumferential margins 18 of the casing between the holes 28 therein, so that the terminal ends of the pleats are interconnected with the ends 2', 4' of the conduits in the same manner as the margins 18 of the sections 32. Therefore, when the ends of the conduits undergo relative motion crosswise the axis thereof, the respective sections 32 and the adjoining pleats 36 act as discrete side panels of the joint and accommodate to the offset of the ends from one another according to the axial and circumferential dimensions of the sections themselves, rather than those of the full casing 16. This being the case, the casing as a whole can accommodate to the offset at a lesser dimension axially of the joint than that required by the diametral dimension of the joint. This is in contrast to prior art installations wherein the casing had to be given an axial dimension dictated by the diametral dimension of the joint, because of the continuous unimterrupted character of the casing around the circumference thereof.

This will become more apparent by referring to FIGS. 7–10 wherein it will be seen that when conduits 38 and 40 of the foregoing type are interconnected by an annular casing 42 having a continuously uninterrupted character around the circumference thereof, as in the prior art, then the diametral dimension 44 of the casing requires a certain axial dimension 46, i.e. fabric width, to accommodate to the maximum anticipated deflection between the ends of the conduits crosswise the axis 47 thereof. For example, referring to FIGS. 7 and 8, it will be seen that the extent to which the ends of the conduits can offset one another laterally of the axis (i.e. the deflection 48 in FIG. 8) depends on the axial and diametral dimensions of the joint; and moreover, the greater the diametral dimension 44, the greater must be the axial dimension 46 to enable the ends to move into relatively offset relationship to one another as illustrated by the arc 50 in FIG. 7. Put another way, the minimal axial dimension 46 of the joint is dictated by the diametral dimension 44 thereof, since unless the joint has this minimal axial dimension, it will tear itself apart when the ends offset from one another in the arc 50 permitted by the diametral dimension of the casing.

Figure 9:
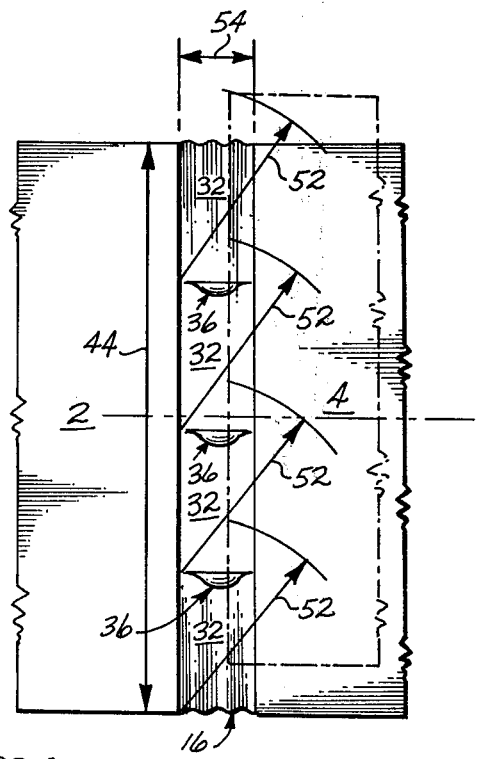
FIG. 9 is a schematic representation of the inventive installation and the joint therein.
Figure 10:
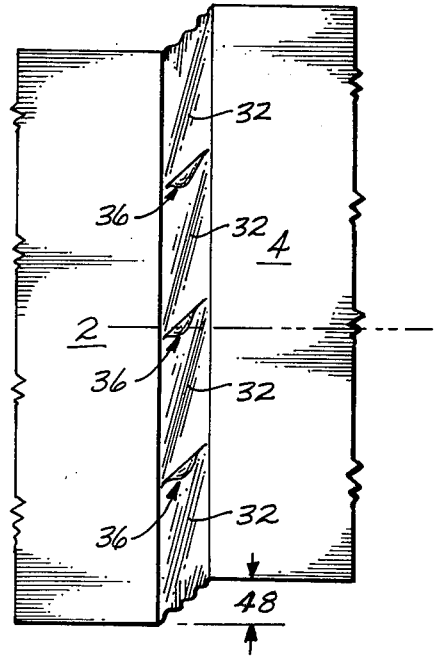
FIG. 10 is a schematic representation of the inventive installation showing the action of the joint when the ends of the conduits undergo the described motion.

According to the invention, however, the axial dimension of the casing can be reduced to a lesser value without violating this relationship between the axial and diametral dimensions of the joint. As seen in FIGS. 9 and 10, this is accomplished by introducing pleats 36 into the body of the casing 16 on the sides thereof profiled to each line of deflection. As a result, the respective sections 32 between the pleats make individual adjustments over arc lengths 52 shorter than that dictated by the full diametral dimension 44 of the joint, thus allowing the axial dimension 54 of the sections to be shorter at the deflection 48, and since the axial dimension 54 of the joint as a whole corresponds to this latter dimension of the sections, it too is shortened.

Referring again now to FIGS. 1–6, as well as to FIGS. 11–13, it will be seen that each pleat 36 is formed by relatively juxtaposing the adjacent axial edge portions 32' of adjacent sections 32 of the casing 16 and interconnecting the respective edges of the portions with one another to form a fold 56 or 56' through 56''' (FIGS. 11–13) of the casing material between the sections. In the embodiment of FIGS. 1–6, the sections 32 are discrete pieces of material and the relatively juxtaposed axial edge portions 32' of the same are secured to one another adjacent the edges 58 thereof to form the fold 56 by sewing 60, vulcanization or the like. Moreover, the portions 32' are convexly arcuate at their edges 58 so that the fold 56 has an arcuate bulge to it, axially thereof, between the circumferential margins 18 of the casing. Of course, at the margins, the terminal ends 36' of the pleat are flattened more into the same plane with the body 16 of the casing by the clamping action of the irons 24.

In FIGS. 11-13, the sections 32 are monolithic and each fold 56', 56" or 56''' is a continuum thereof in the sense that a portion 62 of the casing material is gathered between each pair of sections and raised out of the body of the casing 16 to form the fold. The folds 56', 56" and 56''' have various configurations from FIGURE to FIGURE, however, in planes perpendicular to the axis of the conduits. In FIG. 11 each fold 56' is bent in one direction circumferentially of the joint to overlie the adjacent section 32. In FIG. 13, each fold 56''' is flattened so as to overlie both of the adjacent sections 32. In FIG. 12, one end portion 62' of the fold 56" is bent to overlie one of the adjacent sections, and the other end portion 62" of the fold is bent to overlie the other adjacent section, there being a twist 64 in the fold intermediate the two end portions to accommodate the reversedly bent nature of them.

Furthermore, since the pleats 36 in FIGS. 11-13 employ folds which terminate in the margins 18 of the casing so as to produce two layers of material overlying the body 16 of the casing, it is desirable to interpose filler material 66 between the pairs of pleats around the circumferences of the margins before they are clamped to the ends of the conduits. In fact, for ease of assembly, strips 68 of the casing material 16 may be employed for this purpose, and as seen in FIGS. 11-13, a pair of the strips 68 are superposed on the margins of the casing between each pair of pleats, to build up the margins to a level corresponding to that of the ends of the pleats.

In FIGS. 11-13, moreover, bolt holes 28 are employed at the ends of the pleats, as well as in the spaces between pairs of pleats.

In the embodiment of FIG. 14, two additional layers 70 and 72 of casing material are superposed on the original layer 16 to provide a build up casing 74. In such a case, moreover, the folds 75 in the pleats are grouped in relatively stacked assemblies thereof, and are bent over in a common direction circumferentially of the joint, but relatively staggered to one another in such direction as seen. Furthermore, filler strips 76 are overlaid in the spaces adjacent the fold assemblies in such direction, and other strips 76 are underlaid in the spaces adjacent the assemblies in the opposite direction.

Filler material 66 may also be employed in the embodiment of FIGS. 1-6, depending on the character and thickness of the casing material 16.

Of course, the conduits 2 and 4 can be round instead of polygonal, and the casing 16 can be flat, convex or concave in the neutral condition of the joint.

What is claimed is:

1. A method for forming a flexible expansion joint between the opposing ends of a pair of spaced coaxial conduits which undergo relative deflection along parallels to a line crosswise the axis thereof, comprising interposing an annular casing on the line of deflection in the space between the opposing ends of the conduits and connecting the casing with the ends coaxially of the conduits, the body of said casing when seen in profile to the line of deflection having opposing relatively top and bottom outlines and interconnecting sides therebetween, and said sides being divided along generally axially extending lines symmetrically arrayed about the line of deflection in spaced relationship to the outlines of the casing to form an equal number of discrete casing sections on the respective sides having substantially equal widths circumferentially of the casing, and interconnecting the axial edges of adjacent sections with generally U-shaped fold-like pleats of bendably flexible material, the folds of which project peripherally inwardly or outwardly from the body of the casing in the neutral condition of the joint and are adapted so that when the conduits undergo relative deflection as indicated, the casing accomodates to the deflection at a lesser dimension axially of the joint than that required by the diametral dimension of the joint.

2. The method according to claim 1 wherein each pleat is formed by relatively juxtaposing the adjacent axial edge portions of the adjacent sections of the casing and interconnecting the respective edges of the portions with one another to form a fold of the casing material between the sections.

3. The method according to claim 2 wherein the sections are discrete pieces of material and the relatively juxtaposed axial edge portions of the same are interconnected by securing them to one another adjacent the edges thereof to form the fold.

4. The method according to claim 2 wherein the sections are monolithic and a portion of the casing material is gathered between the sections and relatively raised out of the body of the casing to form the fold as a continuum of the sections.

5. The method according to claim 3 wherein the fold is given an arcuate bulge axially thereof between the circumferential margins of the casing.

6. The method according to claim 5 wherein the relatively juxtaposed axial edge portions of the sections are made convexly arcuate at their edges to give the fold the indicated bulge.

7. The method according to claim 4 wherein the fold is bent in one direction circumferentially of the joint so as to overlie the adjacent section between the circumferential margins of the casing.

8. The method according to claim 4 wherein the fold is flattened so as to overlie the adjacent sections between the circumferential margins of the casing.

9. The method according to claim 4 wherein one end portion of the fold is bent so as to overlie one of the adjacent sections, and the other end portion of the fold is bent so as to overlie the other adjacent section, there being a twist formed in the fold between the two end portions to accommodate the reversedly bent nature of them.

10. The method according to claim 1 wherein the sections are interconnected with the ends of the conduits by clamping the circumferential margins of the casing material to the ends.

11. The method according to claim 10 wherein the pleats are terminated in the circumferential margins of the casing so that the pleats are also interconnected with the ends of the conduits in the foregoing fashion.

12. The method according to claim 11 wherein strips of filler material are interposed in the circumferential spaces between the terminal ends of the pleats to impart a uniform thickness to the margins of the casing around the circumference thereof.

13. The method according to claim 1 wherein the casing comprises two or more relatively superposed layers of the casing material.

14. The method according to claim 13 wherein each pleat is formed by relatively juxtaposing the adjacent axial edge portions of the adjacent sections of the casing and interconnecting the respective edges of the portions with one another to form a fold of the casing material between the sections and wherein the folds in the respective layers are grouped in relatively stacked assemblies thereof, and are bent over in a common direction circumferentially of the joint, but relatively staggered to one another in such direction.

15. The method according to claim 14 wherein filler strips are overlaid in the circumferential spaces adjacent the fold assemblies in such direction, but underlaid in the circumferential spaces adjacent the fold assemblies in the opposite direction.

16. In combination, means defining a pair of spaced coaxial conduits which undergo relative deflection along parallels to a line crosswise the axis thereof, and a flexible expansion joint interconnecting the same, said joint comprising an annular casing which is interposed on the line of deflection in the space between the opposing ends of the conduits and connected with the ends coaxially of the conduits, the body of said casing when seen in profile to the line of deflection having opposing relatively top and bottom outlines and interconnecting sides therebetween, and said sides being divided along generally axially extending lines symmetrically arrayed about the line of deflection in spaced relationship to the outlines of the casing to form an equal number of discrete casing sections on the respective sides having substantially equal widths circumferentially of the casing, there being generally U-shaped fold-like pleats of bendably flexible material interconnecting the axial edges of adjacent sections, the folds of which project peripherally inwardly or outwardly from the body of the casing in the neutral condition of the joint and are adapted so that when the conduits undergo relative deflection as indicated, the casing accomodates to the deflection at a lesser dimension axially of the joint than that required by the diametral dimension of the joint.

17. The combination according to claim 16 wherein the adjacent axial edge portions of the adjacent sections of the casing are relatively juxtaposed and interconnected with one another at the respective edges thereof to form folds of the casing material between the sections.

18. The combination according to claim 17 wherein the sections are discrete pieces of material and the relatively juxtaposed axial edge portions of the same are secured to one another adjacent the edges thereof to form the folds.

19. The combination according to claim 17 wherein the sections are monolithic and portions of the casing material are gathered between pairs of sections and relatively raised out of the body of the casing to form the folds.

20. The combination according to claim 18 wherein each fold has an arcuate bulge axially thereof between the circumferential margins of the casing.

21. The combination according to claim 20 wherein the relatively juxtaposed axial edge portions of the sections are convexly arcuate at their edges.

22. The combination according to claim 19 wherein the folds are bent in one direction circumferentially of the joint so as to overlie the adjacent sections between the circumferential margins of the casing.

23. The combination according to claim 19 wherein the folds are flattened so as to overlie the adjacent sections between the circumferential margins of the casing.

24. The combination according to claim 16 wherein the circumferential margins of the casing material are clamped to the ends of the conduits to interconnect the sections therewith.

25. The combination according to claim 24 wherein the pleats terminate in the circumferential margins of the casing so that they are also interconnected with the ends of the conduits in the foregoing fashion.

26. The combination according to claim 25 wherein strips of filler material are interposed in the circumferential spaces between the terminal ends of the pleats to impart a uniform thickness to the margins of the casing around the circumference thereof.

27. The combination according to claim 16 wherein the casing comprises two or more relatively superposed layers of the casing material.

28. In combination, means defining a pair of spaced, coaxial conduits having an expansion joint in the space between the opposing ends thereof, said joint comprising an annular casing of bendably flexible material, the body of which is divided circumferentially into a series of sections which are symmetrically arrayed about the axis of the conduits between planes parallel thereto and interconnected across the planes by generally axially extending pleats which have generally inverted U-shaped cross-sections in planes perpendicular to the axis and project peripherally inwardly or outwardly from the body of the casing in the neutral condition of the joint, said pleats and sections being interconnected with the ends of the conduits so that when the ends undergo relative motion crosswise the axis of the conduits, the casing accomodates to the deflection at a lesser dimension axially of the joint than that required by the diametral dimension of the joint, the adjacent axial edge portions of the adjacent sections of the casing being relatively juxtaposed and interconnected with one another at the respective edges thereof to form folds of the casing material between the sections, the sections being monolithic and portions of the casing material being gathered between pairs of sections and relatively raised out of the body of the casing to form the folds, and one end portion of each fold being bent so as to overlie one of the adjacent sections, and the other end portion of the fold being bent so as to overlie the other adjacent section, there being a twist formed in the fold between the two end portions to accomodate the reversedly bent nature of them.

29. In combination, means defining a pair of spaced, coaxial conduits having an expansion joint in the space between the opposing ends thereof, said joint comprising an annular casing of bendably flexible material, the body of which is divided circumferentially into a series of sections which are symmetrically arrayed about the axis of the conduits between planes parallel thereto and interconnected across the planes by generally axially extending pleats which have generally U-shaped cross-sections in planes perpendicular to the axis and project peripherally inwardly or outwardly from the body of the casing in the neutral condition of the joint, said pleats and sections being interconnected with the ends of the conduits so that when the ends undergo relative motion crosswise the axis of the conduits, the casing accomodates to the deflection at a lesser dimension axially of the joint than that required by the diametral dimension of the joint, the casing comprising two or more relatively superposed layers of the casing material, and the adjacent axial edge portions of the adjacent sections of the casing being relatively juxtaposed and interconnected with one another at the respective edges thereof to form folds of the casing material between the sections, and the folds in the respective layers being grouped in relatively stacked assemblies thereof, and bent over in a common direction circumferentially of the joint, but relatively staggered to one another in such condition.

30. The combination according to claim 29 wherein filler strips are overlaid in the circumferential spaces adjacent the fold assemblies in such direction, but underlaid in the spaces adjacent the fold assemblies in the opposite direction.

31. A flexible expansion joint for interconnecting a pair of spaced coaxial conduits which undergo relative deflection along parallels to a line crosswise the axis thereof, said joint comprising an annular casing which is adapted to be interposed on the line of deflection in the space between the opposing ends of the conduits and connected with the ends coaxially of the conduits, the body of said casing when seen in profile to the line of deflection having opposing relatively top and bottom outlines and interconnecting sides therebetween, and said sides being divided along generally axially extending lines symmetrically arrayed about the line of deflection in spaced relationship to the outlines of the casing to form an equal number of discrete casing sections on the respective sides having substantially equal widths circumferentially of the casing, there being generally U-shaped fold-like pleats of bendably flexible material interconnecting the axial edges of adjacent sections, the folds of which project peripherally inwardly or outwardly from the body of the casing in the neutral condition of the joint and are adapted so that when the conduits undergo relative deflection as indicated, the casing accomodates to the deflection at a lesser dimension axially of the joint than that required by the diametral dimension of the joint.

32. The flexible expansion joint according to claim 31 wherein the casing is polygonal.

33. The flexible expansion joint according to claim 31 wherein the circumferential margins of the casing terminate in parallel planes.

34. The flexible expansion joint according to claim 31 wherein the respective sections of the casing are circumferentially continuous and uninterrupted between the axial edges thereof.

35. The flexible expansion joint according to claim 31 wherein the casing is made of bendably flexible material.

36. The flexible expansion joint according to claim 31 wherein the respective sides of the casing are divided into three or more sections.

37. The casing according to claim 31 wherein the adjacent axial edge portions of the adjacent sections of the casing are relatively juxtaposed and interconnected with one another at the respective edges thereof to form folds of the casing material between the sections.

38. The casing according to claim 37 wherein the sections are discrete pieces of material and the relatively juxtaposed axial edge portions of the same are secured to one another adjacent the edges thereof to form the folds.

39. The casing according to claim 37 wherein the sections are monolithic and portions of the casing material are gathered between pairs of sections and relatively raised out of the body of the casing to form the folds.

* * * * *